US012663738B2

(12) United States Patent
Gofuku et al.

(10) Patent No.: US 12,663,738 B2
(45) Date of Patent: Jun. 23, 2026

(54) DEVELOPER STORAGE DEVICE UTILIZING CONVEYANCE CONFIGURATION AND IMAGE FORMING APPARATUS

(71) Applicant: CANON KABUSHIKI KAISHA, Tokyo (JP)

(72) Inventors: Shuichi Gofuku, Shizuoka (JP); Shinichi Ueda, Shizuoka (JP); Kenichirou Isobe, Kanagawa (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 18/520,407

(22) Filed: Nov. 27, 2023

(65) Prior Publication Data

US 2024/0094660 A1 Mar. 21, 2024

Related U.S. Application Data

(63) Continuation of application No. 17/824,530, filed on May 25, 2022, now Pat. No. 11,841,646.

(30) Foreign Application Priority Data

May 31, 2021 (JP) ................................ 2021-091614

(51) Int. Cl.

| | |
|---|---|
| ***G03G 21/12*** | (2006.01) |
| ***G03G 15/08*** | (2006.01) |
| ***G03G 21/10*** | (2006.01) |

(52) U.S. Cl.

CPC ..... *G03G 15/0891* (2013.01); *G03G 15/0856* (2013.01); *G03G 21/105* (2013.01); *G03G 21/12* (2013.01); *G03G 2221/1624* (2013.01)

(58) Field of Classification Search

CPC ............... G03G 21/12; G03G 15/0891; G03G 15/0856; G03G 21/105; G03G 2221/1624

See application file for complete search history.

(56) References Cited

U.S. PATENT DOCUMENTS

2006/0008297 A1 1/2006 Oyama
2008/0317483 A1* 12/2008 Tanimoto .............. G03G 21/12 399/35

(Continued)

FOREIGN PATENT DOCUMENTS

CN 101211146 A 7/2008
CN 102073258 A 5/2011

(Continued)

*Primary Examiner* — Stephanie E Bloss
*Assistant Examiner* — Laura Roth
(74) *Attorney, Agent, or Firm* — Canon U.S.A., Inc. IP Division

(57) ABSTRACT

A developer storage device that stores developer includes a frame having an internal space and an inlet, a partition portion for partitioning the internal space into first and second chambers, the partition portion including a communication port through which the first and second chamber communicate, a conveyance portion arranged in the internal space and configured to convey the developer, and a detection unit detecting an amount of the developer stored in the first chamber. When the amount of the developer in the first chamber is less than a predetermined value, the developer is conveyed to a far side portion of the first chamber by the conveyance portion. When the detection unit detects that the amount of the developer in the first chamber reaches the predetermined value or more, the conveyance portion conveys the developer to the second chamber.

14 Claims, 8 Drawing Sheets

(56) References Cited

U.S. PATENT DOCUMENTS

| | | | | |
|---|---|---|---|---|
| 2009/0257799 | A1* | 10/2009 | Haruno | G03G 21/12 399/360 |
| 2011/0044743 | A1* | 2/2011 | Yuasa | G03G 21/12 399/358 |
| 2014/0270821 | A1 | 9/2014 | Takahashi | |
| 2015/0003881 | A1* | 1/2015 | Shima | G03G 21/105 399/360 |
| 2016/0202657 | A1* | 7/2016 | Koseki | G03G 15/0856 399/35 |
| 2018/0150020 | A1* | 5/2018 | Yanase | G03G 21/105 |
| 2018/0275599 | A1* | 9/2018 | Suenaga | G03G 21/12 |

FOREIGN PATENT DOCUMENTS

| | | | |
|---|---|---|---|
| CN | 112015073 | A | 12/2020 |
| JP | H05289584 | A | 11/1993 |
| JP | H10186985 | A | 7/1998 |
| JP | 2011128657 | A | 6/2011 |
| JP | 2020086411 | A | 6/2020 |

* cited by examiner

DEVELOPER STORAGE DEVICE UTILIZING CONVEYANCE CONFIGURATION AND IMAGE FORMING APPARATUS

CROSS-REFERENCE TO RELATED APPLICATIONS

The present application is a continuation of U.S. patent application Ser. No. 17/824,530, filed on May 25, 2022, which claims priority from Japanese Patent Application No. 2021-091614, filed on May 31, 2021, which are hereby incorporated by reference herein in their entireties.

BACKGROUND OF THE INVENTION

Field of the Invention

The present invention relates to a developer storage device that can store powdery developer and an image forming apparatus that uses the developer storage device. The present invention particularly relates to, in particular, an electrophotographic image forming apparatus adopting an electrophotographic method and a developer storage device.

Description of the Related Art

Conventionally, in a transfer process in an image forming apparatus using an electrophotographic method, a toner image formed on a photosensitive drum, an intermediate transfer belt, and the like may not be completely transferred to a recording medium such as a sheet, and part of toner may remain on the photosensitive drum, the intermediate transfer belt, and the like.

Remaining toner (residual toner) is removed from the photosensitive drum, the intermediate transfer belt, and the like by a cleaning unit and conveyed (collected) by a toner conveyance unit to a toner storage container arranged inside the image forming apparatus.

According to Japanese Patent Application Laid-Open No. 2003-248402, an image forming apparatus is discussed in which a toner storage container is replaceable with a new one in a case where an amount of residual toner collected in the toner storage container reaches an upper limit value of a storage capacity thereof.

More specifically, according to Japanese Patent Application Laid-Open No. 2003-248402, a user is notified of a replacement time and prompted to prepare a new toner storage container before the residual toner amount in the toner storage container reaches the upper limit value of the storage capacity so that a period during which the image forming apparatus cannot be used is shortened.

According to Japanese Patent Application Laid-Open No. 2003-248402, a shape of the toner storage container is a "vertically long shape" in which a length in a "gravity direction" is long and a length in a "horizontal direction" is short in a posture during use. A toner inlet is provided on an upper side of the toner storage container in the gravity direction.

According to Japanese Patent Application Laid-Open No. 2003-248402, two detection units are provided to detect the toner amount in the toner storage container. A first detection unit constantly monitors a toner agent level and performs "replacement notice display" for the toner storage container to a user in a case where the toner agent level at a predetermined height is detected. Meanwhile, a second detection unit calculates (predicts) the residual toner amount from a received image signal and, in a case where the toner amount reaches a threshold value (the upper limit value of the storage capacity), performs "full" warning display to a user and also stops an image forming operation of the image forming apparatus until the toner storage container is replaced.

In other words, according to the configuration of Japanese Patent Application Laid-Open No. 2003-248402, the image forming operation can be continuously performed for a while after the "replacement notice display" is performed to the user.

However, with a demand for miniaturization of image forming apparatuses, the "shape" of a toner storage container may be restricted so as to fit into an internal storage space of the miniaturized image forming apparatus.

For example, the "vertically long shape" according to Japanese Patent Application Laid-Open No. 2003-248402 requires a certain height (length) or more in the gravity direction (a height direction). On the other hand, with the miniaturization, the toner storage container may have a "horizontally long shape" in which a length in the gravity direction is short and a length in the horizontal direction is long.

In a case where the toner storage container has the "horizontally long shape", a "toner agent level" is more likely to be unstable, and detection accuracy of the "toner agent level" may be decreased compared with the "vertically long shape" according to Japanese Patent Application Laid-Open No. 2003-248402. Thus, if the "replacement notice display" is performed for the toner storage container having the "horizontally long shape" based on a detection result of the "toner agent level" as discussed in Japanese Patent Application Laid-Open No. 2003-248402, a period during which the image forming operation can be continued after the "replacement notice display" may significantly vary. As a result, the accuracy in determining a service life or the replacement time of the toner storage container may be reduced.

SUMMARY OF THE INVENTION

The present invention is directed to the provision of a configuration that enables accurate determination of a service life or a replacement time even if a shape of a storage unit of a developer storage device is a horizontally long shape in which a length in the gravity direction is short and a length in the horizontal direction is long in a posture during use.

According to an aspect of the present invention, a developer storage device for use in an image forming apparatus for storing developer includes a frame having an internal space for storing the developer and an inlet through which the developer is fed into the internal space, a partition portion that partitions the internal space into a first chamber and a second chamber that has a smaller volume than the first chamber and that is aligned with the first chamber in a horizontal direction in a posture in which the developer storage device is used in the image forming apparatus, the partition portion including a communication port through which the first chamber and the second chamber communicate with each other, a conveyance portion arranged in the internal space and configured to convey the developer fed through the inlet, and a detection unit configured to detect an amount of the developer stored in the first chamber. The conveyance portion is configured to, when detection unit detects that the amount of the developer in the first chamber is less than a predetermined value, convey the developer to a far side portion of the first chamber. The conveyance portion is configured to, when the detection unit detects that the amount of the developer in the first chamber reaches the predetermined value or more, not convey the developer to the far side portion of the first chamber but convey the developer to the second chamber.

Further features of the present invention will become apparent from the following description of exemplary embodiments with reference to the attached drawings.

DESCRIPTION OF THE EMBODIMENTS

An electrophotographic image forming apparatus (hereinbelow, sometimes simply referred to as an "image forming apparatus") according to the present invention will be described below with reference to the accompanying drawings.

Exemplary embodiments described below are intended to illustratively describe the present invention, and unless otherwise specifically described, sizes, materials, shapes, and relative positional relationships of components described below are not intended to limit the scope of the present invention.

Herein, an electrophotographic image forming apparatus refers to an apparatus that forms an image on a recording medium by an electrophotographic image forming method. Examples of an electrophotographic image forming apparatus include an electrophotographic copying machine, an electrophotographic printer (e.g., a laser beam printer and a light emitting diode (LED) printer), a facsimile device, and a word processor.

A developer storage device is used in an image forming apparatus and is attachable to and detachable from a main body of the image forming apparatus.

A first exemplary embodiment of the present invention will be described. An image forming apparatus 1 according to the present exemplary embodiment will be described below with reference to FIGS. 1A to 7B.

Figure 2:
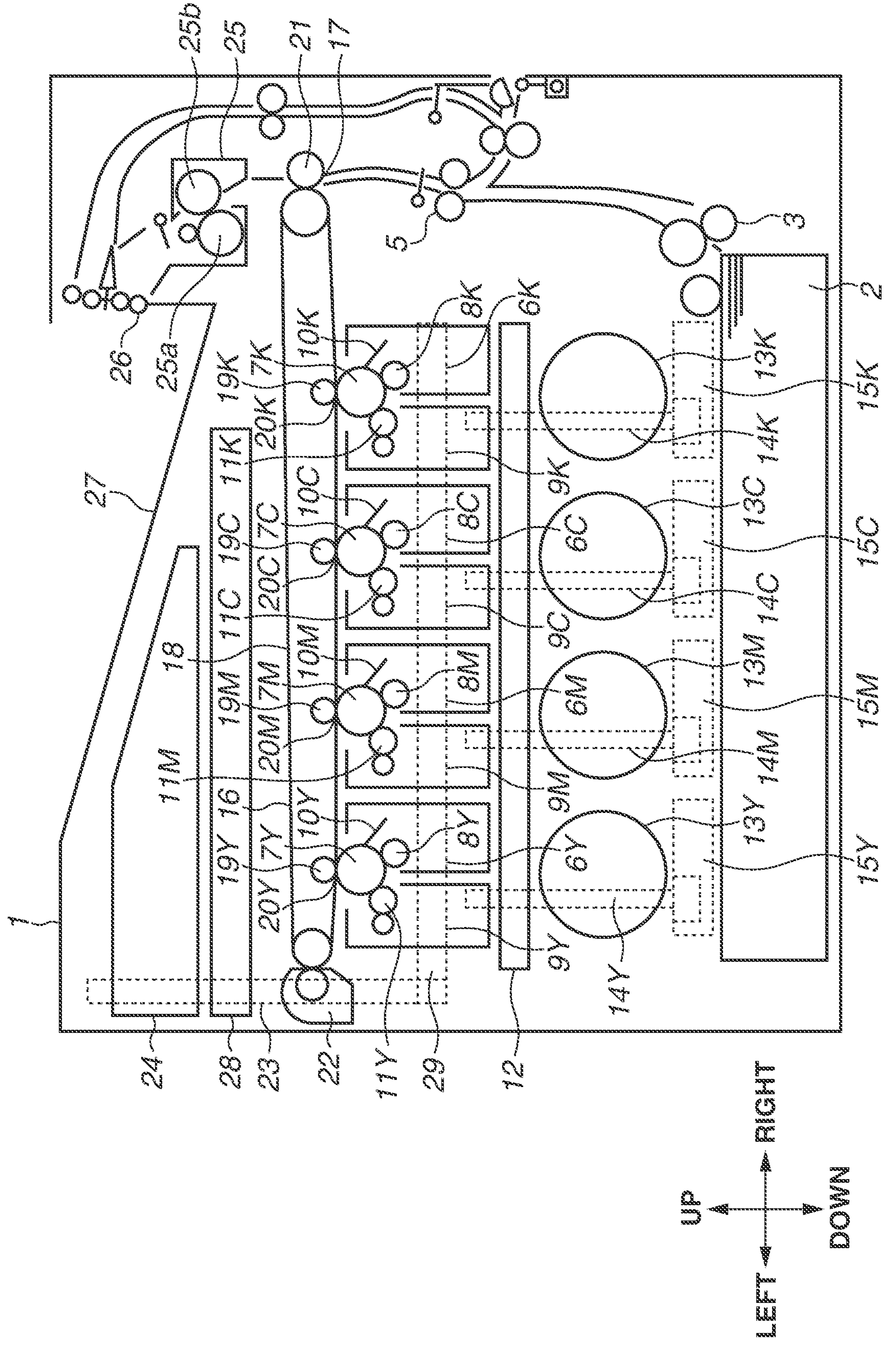
FIG. 2 is a main cross-section conceptual diagram illustrating an overall configuration of an image forming apparatus according to the first exemplary embodiment of the present invention.

FIG. 2 is a main cross-section conceptual diagram illustrating an overall configuration of the image forming apparatus 1 according to the first exemplary embodiment of the present invention.

Figure 3:
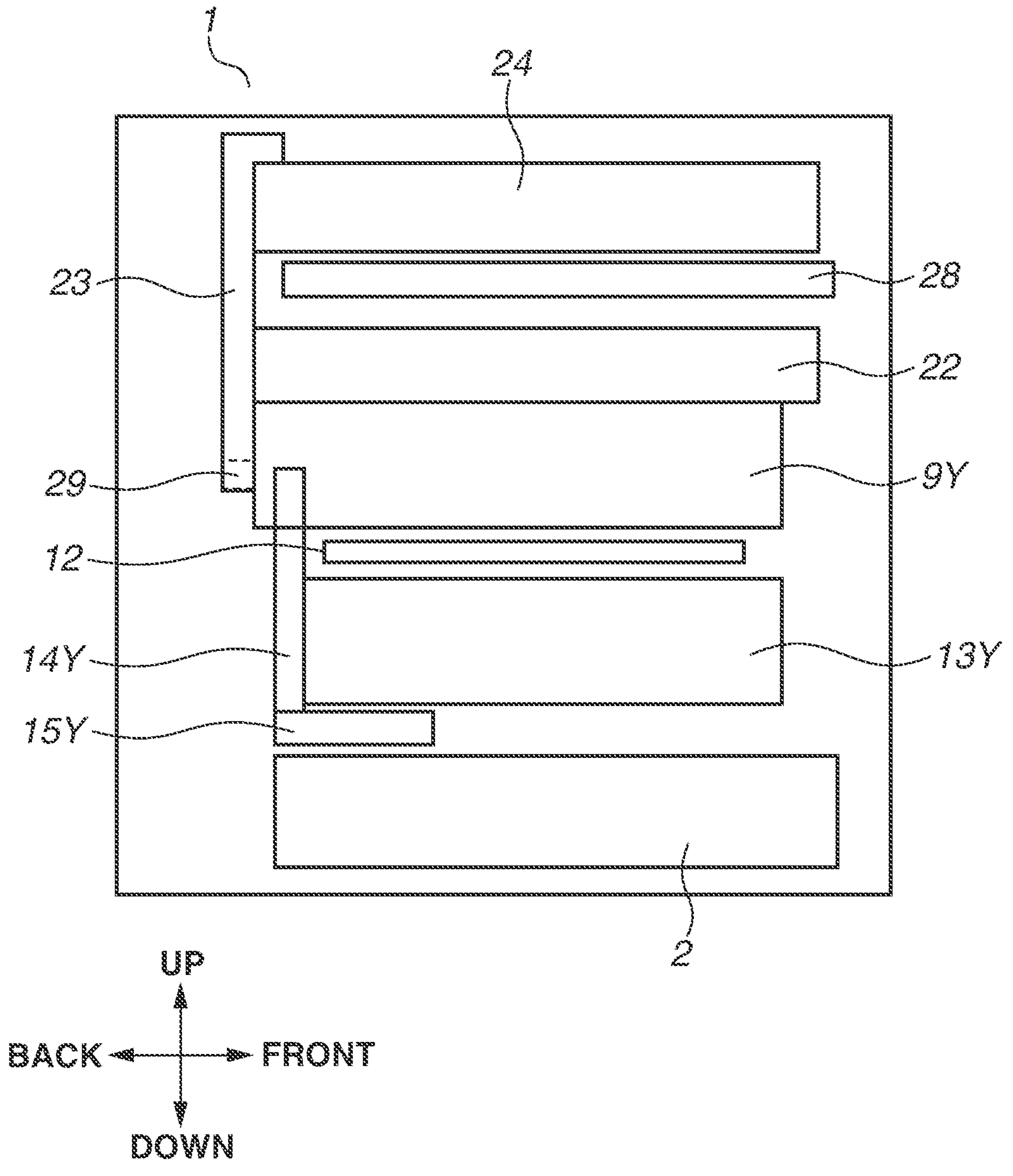
FIG. 3 is a side cross-section conceptual diagram illustrating the overall configuration of the image forming apparatus according to the first exemplary embodiment of the present invention.

FIG. 3 is a side cross-section conceptual diagram illustrating the overall configuration of the image forming apparatus 1 according to the first exemplary embodiment of the present invention.

In the first exemplary embodiment, a "vertical direction" indicated in the drawings is the gravity direction, and a "right-and-left direction" and a "back-and-forth direction" are the horizontal direction.

(Sheet Feeding)

A cassette 2 is stored in a drawable manner in a lower part of the image forming apparatus 1. A cassette feed unit 3 is arranged near an end of the cassette 2. Transfer materials are each stacked and stored in the cassette 2, separated one by one, and fed to a registration roller 5.

(Image Forming Unit)

The image forming apparatus 1 includes image forming stations 6 (Y, M, C, and K) (also referred to as image forming units 6) corresponding to respective colors of yellow, magenta, cyan, black as image forming units horizontally arranged in line.

The image forming units 6 include photosensitive drums 7 (Y, M, C, and K) serving as image bearing members and charging devices 8 (Y, M, C, and K) that uniformly charge surfaces of the photosensitive drums 7. The image forming units 6 further include development devices 9 (Y, M, C, and K) that cause toner to adhere to electrostatic latent images and develop them as toner images and photosensitive member cleaning blades 10 (Y, M, C, and K) (first collecting members) that remove residual toner remaining on the photosensitive drums 7.

The development devices 9 are provided with development rollers 11 (Y, M, C, and K) corresponding to the respective colors so as to be able to come into contact with and separate from the respective photosensitive drums 7. The development rollers 11 are brought into contact with or separated from the photosensitive drums 7 in agreement with the electrostatic latent images, which improves lives of the development rollers 11.

A scanner unit 12 that forms the electrostatic latent images on the photosensitive drums 7 by emitting laser beams based on image information is arranged below the image forming units 6.

(Transfer)

An intermediate transfer unit 16 is arranged above the development devices 9. The intermediate transfer unit 16 is arranged substantially horizontally with a secondary transfer portion 17 side below. An intermediate transfer belt 18 (an intermediate transfer member) facing the respective photosensitive drum 7 is a rotatable endless belt and is stretched on a plurality of stretching rollers. On an inner surface of the intermediate transfer belt 18, primary transfer rollers 19 (Y, M, C, and K) as primary transfer members are respectively arranged in positions at which primary transfer portions 20 (Y, M, C, and K) are formed with the respective photosensitive drums 7 via the intermediate transfer belt 18.

The toner images are transferred from the respective photosensitive drums 7 to the intermediate transfer belt 18 by the primary transfer rollers 19 to which voltage is applied at the respective primary transfer portions 20. According to the present exemplary embodiment, a unit including the intermediate transfer belt 18, the plurality of stretching rollers on which the intermediate transfer belt 18 is stretched, and the respective primary transfer rollers 19 is configured as the intermediate transfer unit 16 that is attachable to and detachable from the main body of the apparatus.

A secondary transfer roller 21 serving as a secondary transfer member is in contact with the intermediate transfer belt 18 and forms the secondary transfer portion 17 with a roller on an opposite side via the intermediate transfer belt 18. The toner image transferred on the intermediate transfer belt 18 in the secondary transfer portion 17 is secondarily transferred to the transfer material. The residual toner that cannot be completely transferred to the transfer material in the secondary transfer and remains on the intermediate transfer belt 18 is removed by a cleaning unit 22 (a second collecting member or a collecting member).

The toner removed by the cleaning unit 22 is conveyed to and accumulated in a toner collecting container 24 (a developer storage device) via a collected toner conveyance unit 23. The toner that cannot be transferred to the intermediate transfer belt 18 and remains on the photosensitive drums 7 is conveyed to the collected toner conveyance unit 23 via a cartridge collected toner conveyance unit 29 and further conveyed to the toner collecting container 24.

As described above, according to the present exemplary embodiment, the toner collecting container 24 can store the "residual toner" from at least one or both of the photosensitive drums 7 and the intermediate transfer belt 18. The residual toner is collected by the photosensitive member cleaning blades 10 or the cleaning unit 22 and then conveyed to the toner collecting container 24 by a conveyance unit.

(Fixing and Sheet Discharge)

Subsequently, the transfer material is conveyed to a fixing device 25 and passes through a nip formed by a heating unit 25*a* and a pressure roller 25*b* that is in pressure contact with the heating unit 25*a*, in the fixing device 25. The transfer material that has passed through the fixing device 25 is conveyed to a discharge roller pair 26 and discharged to a sheet discharge tray 27.

(Power Supply Device)

A low voltage power supply device (not illustrated) that supplies voltage to control units of various motors, fans, solenoids, and the like provided in the image forming apparatus 1 is arranged on a rear surface side of the image forming apparatus 1. A high voltage power supply device 28 that applies high voltage to the charging devices 8, the development devices 9, the primary transfer rollers 19, the secondary transfer roller 21, and the like is arranged in a space between the intermediate transfer belt 18 and the toner collecting container 24 on the rear surface side of the image forming apparatus 1.

(Toner Collecting Unit to Toner Collecting Container)

Figure 1A:
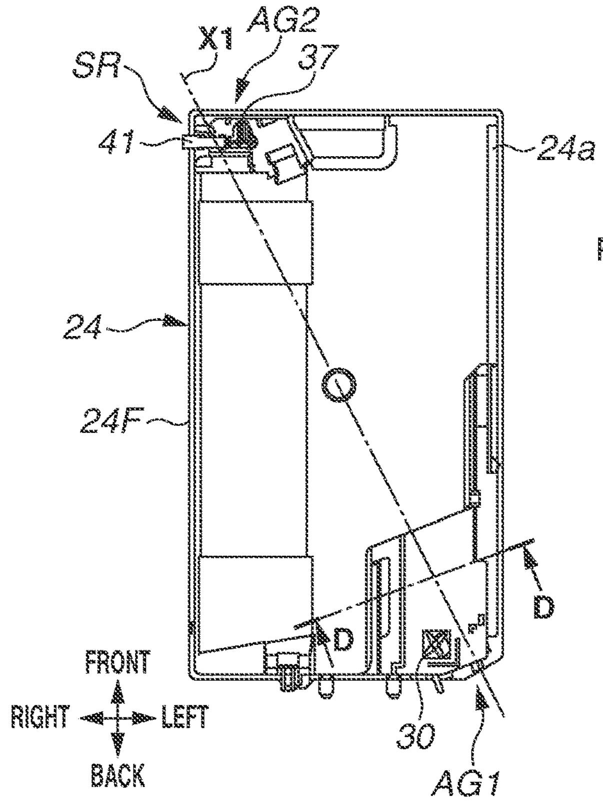
FIG. 1A is a top conceptual diagram illustrating a developer storage device according to a first exemplary embodiment of the present invention.
Figure 1B:
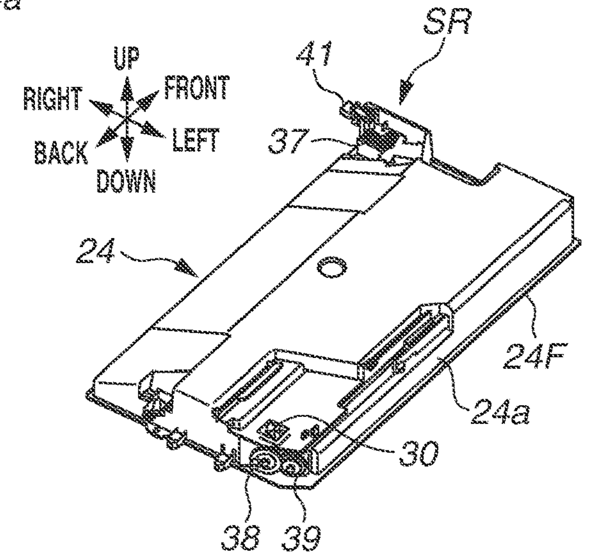
FIG. 1B is a perspective conceptual diagram illustrating the developer storage device.
Figure 1C:
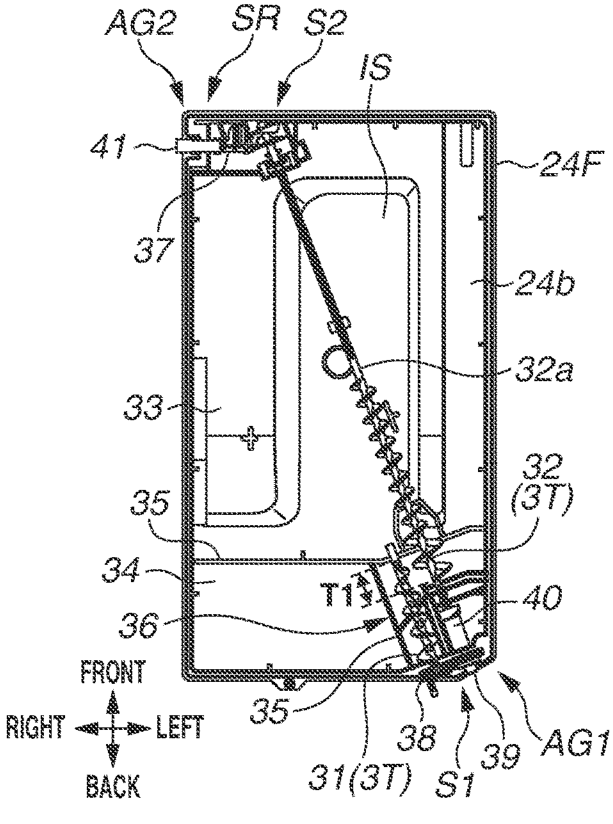
FIG. 1C is a top conceptual diagram illustrating the developer storage device in a state in which the inside thereof is exposed with an upper structure thereof removed.
Figure 1D:
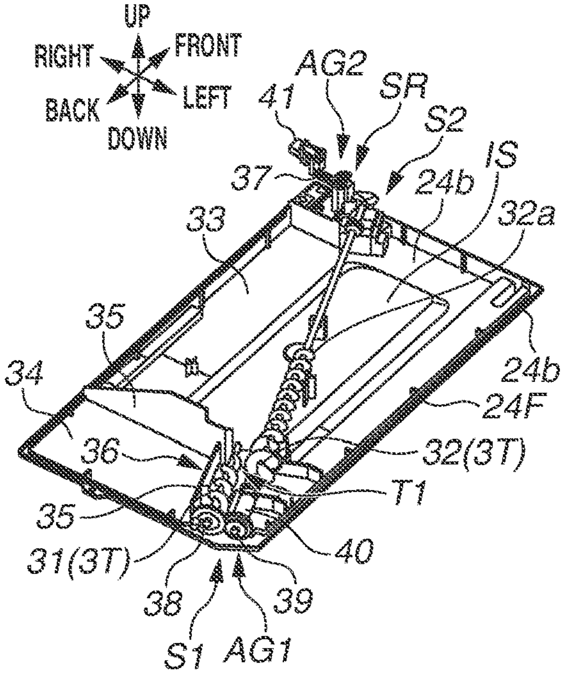
FIG. 1D is a perspective conceptual diagram illustrating the developer storage device in a state in which in which the inside thereof is exposed with the upper structure thereof removed.

FIG. 1A is a top conceptual diagram illustrating the developer storage device according to the first exemplary embodiment of the present invention, and FIG. 1B is a perspective conceptual diagram illustrating the developer storage device. FIG. 1C is a top conceptual diagram illustrating the developer storage device in a state in which the inside thereof is exposed with an upper structure thereof removed, and FIG. 1D is a perspective conceptual diagram illustrating the developer storage device in a state in which the inside thereof is exposed with the upper structure thereof removed.

More specifically, FIG. 1A illustrates a state of a top surface of the toner collecting container 24. FIG. 1B illustrates a state of the toner collecting container 24 viewed from obliquely above. FIG. 1C illustrates a state in which an upper structure 24*a* of the toner collecting container 24 is removed, and FIG. 1D illustrates a state in which the toner collecting container 24 with the upper structure 24*a* removed is viewed from obliquely above.

The toner conveyed by the collected toner conveyance unit 23 (refer to FIG. 3) is received in the toner collecting container 24 from a toner supply port 30 (an inlet). The toner collecting container 24 has a horizontally long shape in which a length in the "right-and-left direction" and the "back-and-forth direction", which are the horizontal direction is longer than a length in the vertical direction, which is the gravity direction. The toner collecting container 24 can form an internal space IS for collecting toner inside a frame 24F by connecting the upper structure 24*a* and a lower structure 24*b*, which form the frame 24F.

The internal space of the toner collecting container 24 is partitioned into a first storage chamber 33 (a first chamber) and a second storage chamber 34 (a second chamber) by a partition 35 (a partition portion). The partitioned internal space having a smaller volume is referred to as the second storage chamber 34, and the internal space other than the second storage chamber 34 is referred to as the first storage chamber 33. The partition 35 is provided with a communication port 36 with which the first storage chamber 33 and the second storage chamber 34 communicate.

A first screw 31 (a first conveyance screw) and a second screw 32 (a second conveyance screw) that form a conveyance member (conveyance portion) 3T are arranged side by side in the horizontal direction below the toner supply port 30. The second screw 32 is longer than the first screw 31 and extends to near a center of the first storage chamber 33. The position of the communication port 36 (a communication port side) is located on an opposite side of the second screw 32 with reference to the first screw 31, and a lower end position 311 of the first screw 31 is located below a lower end position 361 of the communication port 36.

According to the present exemplary embodiment, the first screw 31 is arranged directly below the toner supply port 30, and the second screw 32 is arranged to extend from a toner supply port side S1 (an inlet side) to a far side S2 on the opposite side.

In particular, according to the present exemplary embodiment, the frame 24F is formed to have a rectangular (square) shape in a plan view. The toner supply port 30 is arranged at a corner portion AG1 of the rectangle. The second screw 32 is arranged to extend from a corner portion side (AG1) to a corner portion side (AG2) on the opposite side of the corner portion (AG1) on a diagonal line X1.

In other words, according to the present exemplary embodiment, the toner collecting container 24 is provided with the frame 24F that includes the internal space IS for storing the toner and the toner supply port 30 for feeding the toner into the internal space.

The toner collecting container 24 is provided with the partition 35 that partitions the internal space into the first storage chamber 33 and the second storage chamber 34, which has a smaller volume than the first storage chamber 33, which are arranged side by side in the horizontal direction in the posture during use, and includes the communication port 36 with which the first storage chamber 33 and the second storage chamber 34 communicate. The first screw 31 and the second screw 32 that convey the toner fed from the toner supply port are arranged in the internal space IS.

Figure 4A:
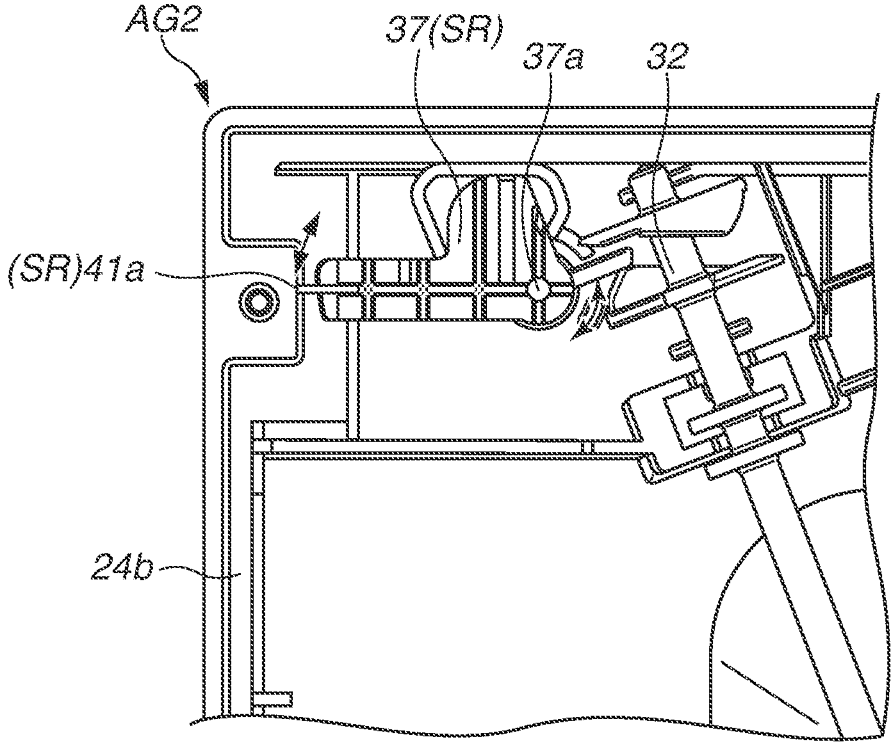
FIGS. 4A and 4B are conceptual diagrams illustrating an operation of a detection unit in the developer storage device according to the first exemplary embodiment of the present invention.
Figure 4B:
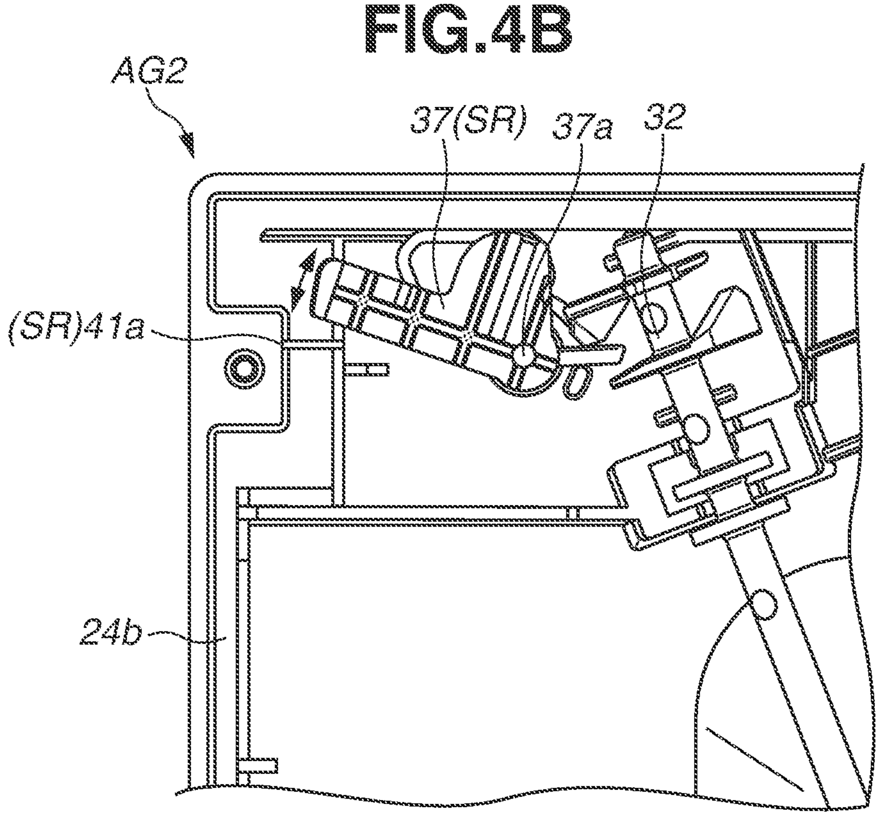

FIGS. 4A and 4B are conceptual diagrams illustrating an operation of a detection unit in the developer storage device according to the first exemplary embodiment of the present invention.

As illustrated in FIGS. 4A and 4B, a lever 37 interlocking with the second screw 32 is arranged downstream of the second screw 32 in the first storage chamber 33.

The lever 37 reciprocates between a position at which an optical axis 41*a* of a photosensor 41 is shielded from light as illustrated in FIG. 4A and a position at which the lever 37 does not shield the optical axis 41*a* of the photosensor 41 by moving forward and allows light to pass through as illustrated in FIG. 4B. The lever 37 and the photosensor 41 form a detection unit SR of the present invention.

The lever 37 pivots about a lever center 37*a* and reciprocated by the second screw 32. Here, FIGS. 4A and 4B illustrate a state in which the upper structure 24*a* is removed for the sake of description. If the second screw 32 makes one rotation, the lever 37 reciprocates once.

The first screw 31 is connected to a drive transmission gear 38 and is driven if the drive transmission gear 38 is driven by a drive unit (not illustrated). The second screw 32 is connected to a driven gear 39 via a torque limiter 40 (a rotation regulating member) serving as a rotation regulating unit, and the driven gear 39 is driven by engaging with the drive transmission gear 38.

Next, a behavior of the toner in the toner collecting container 24 will be described with reference to FIGS. 5A, 5B, and 6.

Figure 5A:
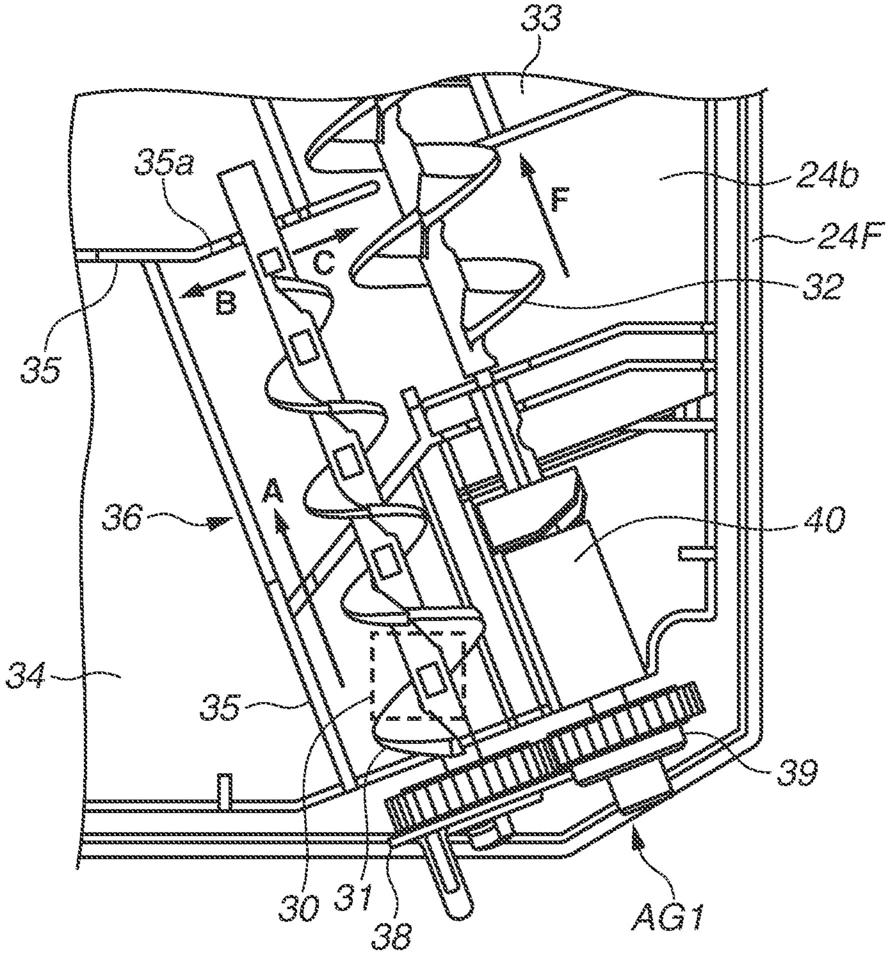
FIG. 5A is an enlarged plan conceptual diagram illustrating near an inlet of the developer storage device according to the first exemplary embodiment of the present invention.
Figure 5B:
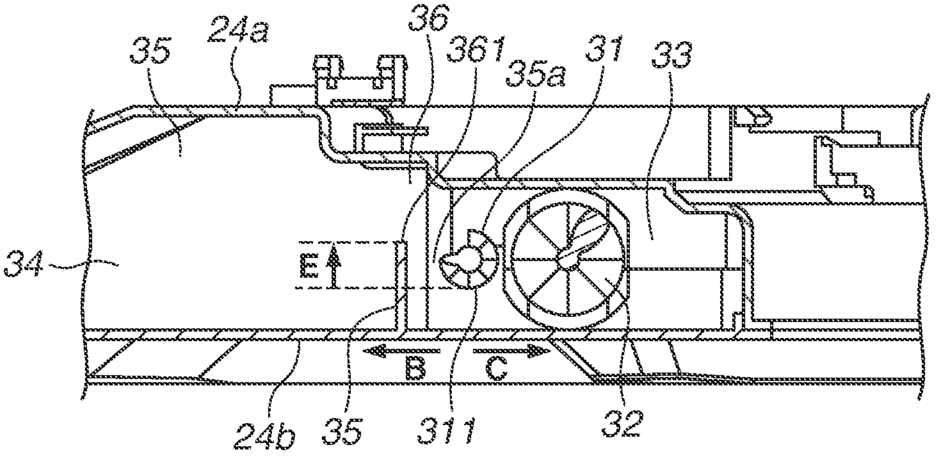
FIG. 5B is an enlarged cross-section conceptual diagram illustrating near the inlet.

FIG. 5A is an enlarged plan conceptual diagram illustrating near an inlet of the developer storage device according to the first exemplary embodiment of the present invention, and FIG. 5B is an enlarged cross-section conceptual diagram illustrating near the inlet.

Figure 6:
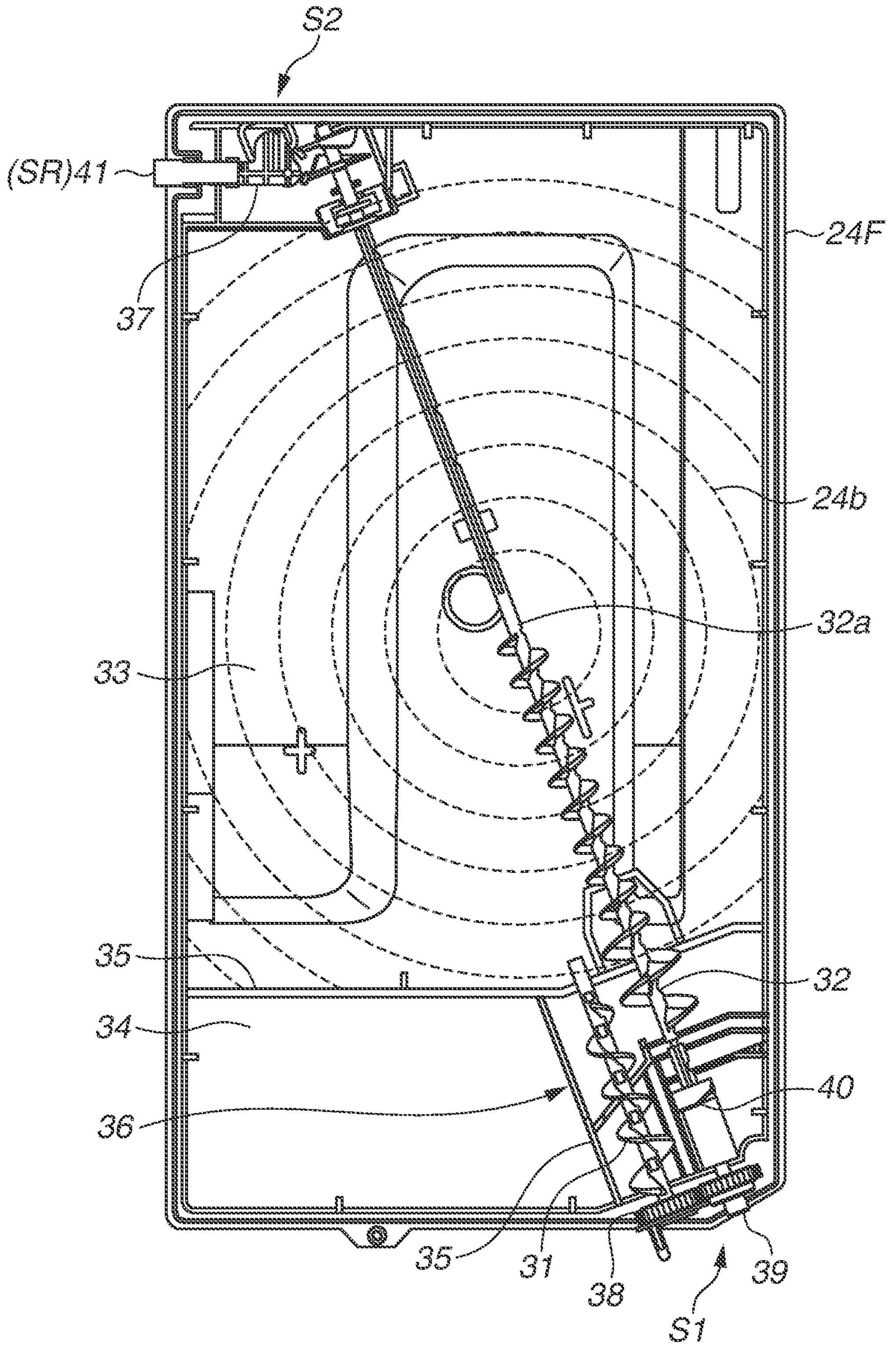
FIG. 6 is a conceptual diagram illustrating a filling state of developer in a first storage chamber in the developer storage device according to the first exemplary embodiment of the present invention.

FIG. 6 is a conceptual diagram illustrating a filling state of the developer in the first storage chamber in the developer storage device according to the first exemplary embodiment of the present invention.

Specifically, FIG. 5A illustrates a part near the second screw 32 from the toner supply port 30 in a state in which the upper structure 24*a* is removed. FIG. 5B illustrates a state of a cross section taken along a line D-D in FIG. 1A.

If the toner is supplied from the toner supply port 30 in the state illustrated in FIGS. 5A and 5B, the toner is conveyed in an arrow A direction by the first screw 31. The toner is conveyed by the first screw 31 until it hits a first screw downstream partition 35*a* and accumulates in a downstream area of the first screw 31. As the toner accumulates in the downstream area of the first screw 31, the toner advances along a wall of the first screw downstream partition 35*a* and spreads in directions of an arrow B and an arrow C.

A position of the communication port 36 on the partition 35 is located above a lower end of the first screw 31 in the gravity direction as indicated by an arrow E, so that the toner is conveyed by the second screw 32 before a toner agent level rises to enter the second storage chamber 34.

Here, it is desirable that the second screw 32 has a conveyance amount of the toner greater than that of the first screw 31.

Since the second screw 32 is located downstream of the first screw 31, increasing of the conveyance amount in the downstream makes it is possible to prevent stagnation of toner caused by toner that has conveyed from the upstream not being able to be completely conveyed in the downstream.

In other words, the first screw 31 and the second screw 32 arranged in parallel makes it possible to make the conveyance amount of the second screw 32 greater than the conveyance amount of the first screw 31 at least in an area T1 in which the first screw 31 faces the second screw 32. This enables the toner to be effectively conveyed to a far side of the first storage chamber 33, thus reducing or preventing stagnation of toner near the toner supply port 30. Thus, it is possible to reduce or prevent flowing of the toner into the second storage chamber 34 at this point.

If the toner reaches the second screw 32 arranged side by side of the first screw 31 in the horizontal direction, the toner is conveyed to a portion near the center of the first storage chamber 33 in an arrow F direction by the second screw 32.

As illustrated by (circular) dashed lines in FIG. 6, the toner conveyed by the second screw 32 concentrically spreads from a screw edge 32*a* of the second screw 32 into the first storage chamber 33 and accumulates therein.

As the toner accumulates in the first storage chamber 33, the periphery of the second screw 32 is filled with the toner, and a rotational load of the second screw 32 increases because the toner becomes a load for driving the second screw 32. If the rotational load of the second screw 32 exceeds a torque setting value of the torque limiter 40, the second screw 32 and the torque limiter 40 idle, and rotation of the second screw 32 stops.

When the second screw 32 stops, the lever 37 interlocking with the second screw 32 also stops. As a method of detecting the stop of the lever 37, if a detection result of the photosensor 41 does not switch between shielding and transmission of light within a time period of one rotation of the second screw 32, it is determined that the lever 37 has stopped.

As described above, the detection unit SR (the photosensor 41) can detect the toner amount in the first storage chamber 33 based on a rotation state of the second screw 32.

Figure 7A:
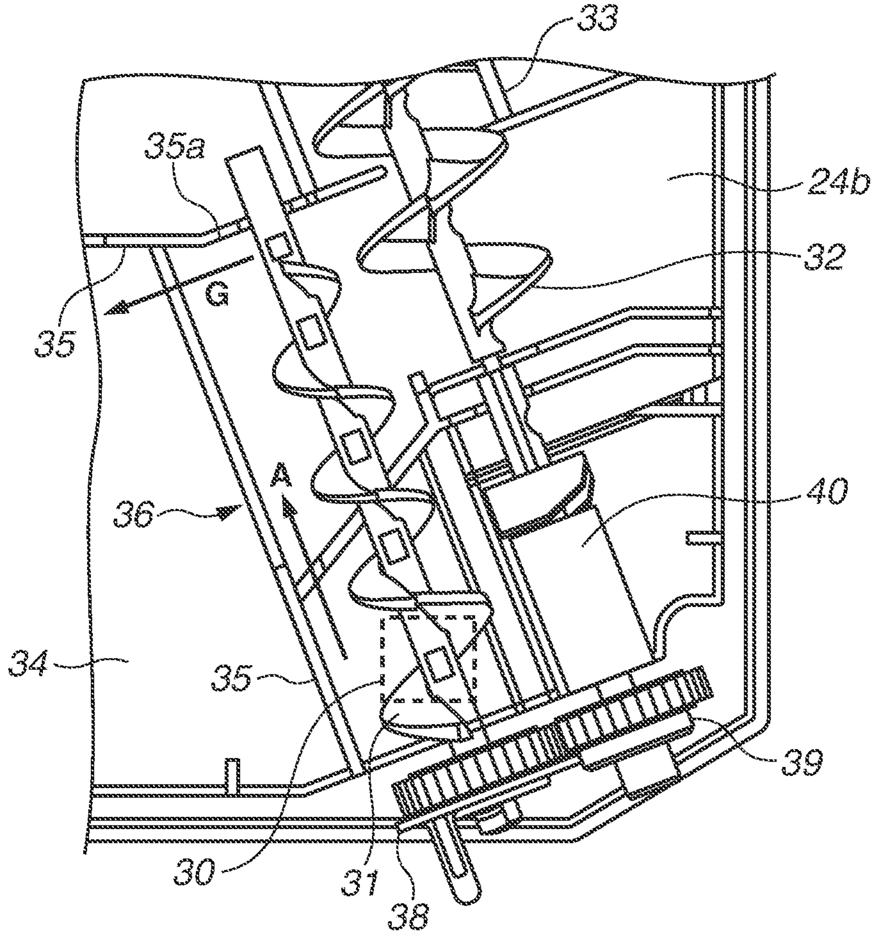
FIG. 7A is an enlarged plan conceptual diagram illustrating a conveyance path of the developer to a second storage chamber in the developer storage device according to the first exemplary embodiment of the present invention.
Figure 7B:
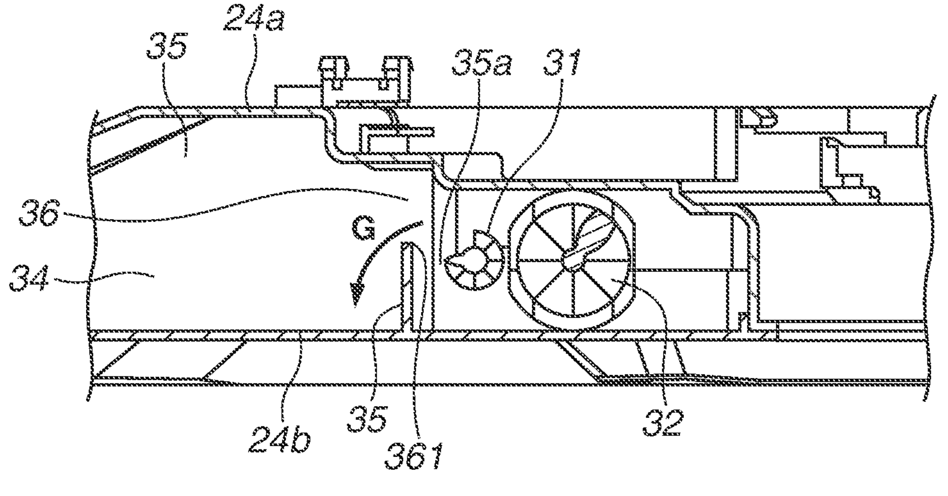
FIG. 7B is an enlarged cross-section conceptual diagram illustrating the conveyance path of the developer to the second storage chamber.

The stop of the lever 37 means that the toner is accumulated in the first storage chamber 33, and thus a user is notified that a replacement time of the toner collecting container 24 is soon (hereinbelow, such a notification is described as a "replacement notice display"). The user receives the replacement notice and thus can have a period for preparing a new toner collecting container 24. FIG. 7A is an enlarged plan conceptual diagram illustrating a conveyance path of the developer to the second storage chamber 34 in the developer storage device according to the first exemplary embodiment of the present invention. FIG. 7B is an enlarged cross-section conceptual diagram illustrating the conveyance path of the developer to the second storage chamber 34.

More specifically, FIGS. 7A and 7B illustrate a state of toner conveyance after the second screw 32 is stopped.

As illustrated in FIGS. 7A and 7B, the first screw 31 is driven after the second screw 32 is stopped, and the toner is conveyed in the arrow A direction and accumulates in a downstream portion of the first screw 31. Since the second screw 32 is stopped, the toner agent level accumulated in the downstream portion of the first screw 31 rises. If the toner agent level exceeds a height of the communication port 36, the toner enters the second storage chamber 34 from the communication port 36 as indicated by an arrow G.

The amount of toner entering the second storage chamber 34 after the second screw 32 is stopped is calculated from the amount of toner collected based on an image signal printed by a user. In a case where the calculated toner amount reaches a toner acceptable amount set from a volume of the second storage chamber 34, the user is notified that the toner collecting container 24 needs to be replaced (hereinbelow, such a notification is described as a replacement necessity notice). After that, the image forming apparatus 1 is in a print stop state until the toner collecting container 24 is replaced.

As described above, in a case where the toner amount in the first storage chamber 33 is less than a predetermined value (a full value), the toner is conveyed to a far side of the first storage chamber 33 by the first and the second screws.

In a case where the photosensor 41 detects that the toner amount in the first storage chamber 33 has reached the predetermined value or more, the rotation of the second screw 32 is stopped, and the toner is not conveyed to the far side of the first storage chamber 33 but conveyed to the second storage chamber 34.

Thus, the toner collecting container 24 according to the present exemplary embodiment is enabled to move toner and store the toner in the second storage chamber 34 after detecting that the toner amount in the first storage chamber 33 reaches the predetermined value (the full value). Thus, a time from when the “replacement notice display” is performed as the toner in the first storage chamber 33 becomes “full” to when the toner collecting container 24 is replaced can be estimated based on the volume of the second storage chamber 34. This improves accuracy in determining a service life (the replacement time) of the toner collecting container 24.

In particular, according to the present exemplary embodiment, the first screw 31 can be arranged so that the lower end position 311 of the first screw 31 is disposed lower than the lower end position 361 of the communication port 36. The lower end of the first screw 31 is located below the lower end of the communication port 36, which increases reliability of, after conveying the toner to the far side of the first storage chamber 33 and the first storage chamber 33 becomes full, conveying the toner to the second storage chamber 34 through the communication port 36. Thus, a period from when the “replacement notice display” is performed to when the replacement is made can be estimated more accurately, and the accuracy in determining the service life (the replacement time) of the toner collecting container is further improved.

Furthermore, according to the present exemplary embodiment, the first screw 31 and the second screw 32 are arranged nearly parallel to each other and can be configured so that the conveyance amount of the second screw 32 is greater than the conveyance amount of the first screw 31 in the area T1 in which the first screw 31 and the second screw 32 face each other.

Thus, the toner can be transferred more smoothly from the first screw 31 to the second screw 32 and can be conveyed more efficiently to the far side of the first storage chamber 33, so that movement of the toner to the second storage chamber 34 is effectively reduced or prevented in a case where the toner is conveyed to the far side of the first storage chamber 33.

In other words, the replacement notice is displayed for a user to provide a period for preparing a new toner collecting container 24 and to prompt the user to replace the toner collecting container 24 immediately after the replacement necessity notice is issued, a period for stopping printing of the image forming apparatus 1 can be eliminated, thus improving usability.

According to the first exemplary embodiment, the internal space of the toner collecting container 24 is partitioned into two spaces, and the space for storing the toner is changed before and after the replacement notice display, so that the toner can be collected after the replacement notice display until the replacement necessity notice is issued. The change of the space for storing the toner is based on a relationship between drive and stop of the two screws and arrangement of the two spaces for storing the toner and can be realized with a low-cost configuration without increasing the number of components.

Next, a second exemplary embodiment of the present invention will be described with reference to FIG. 8.

Figure 8:
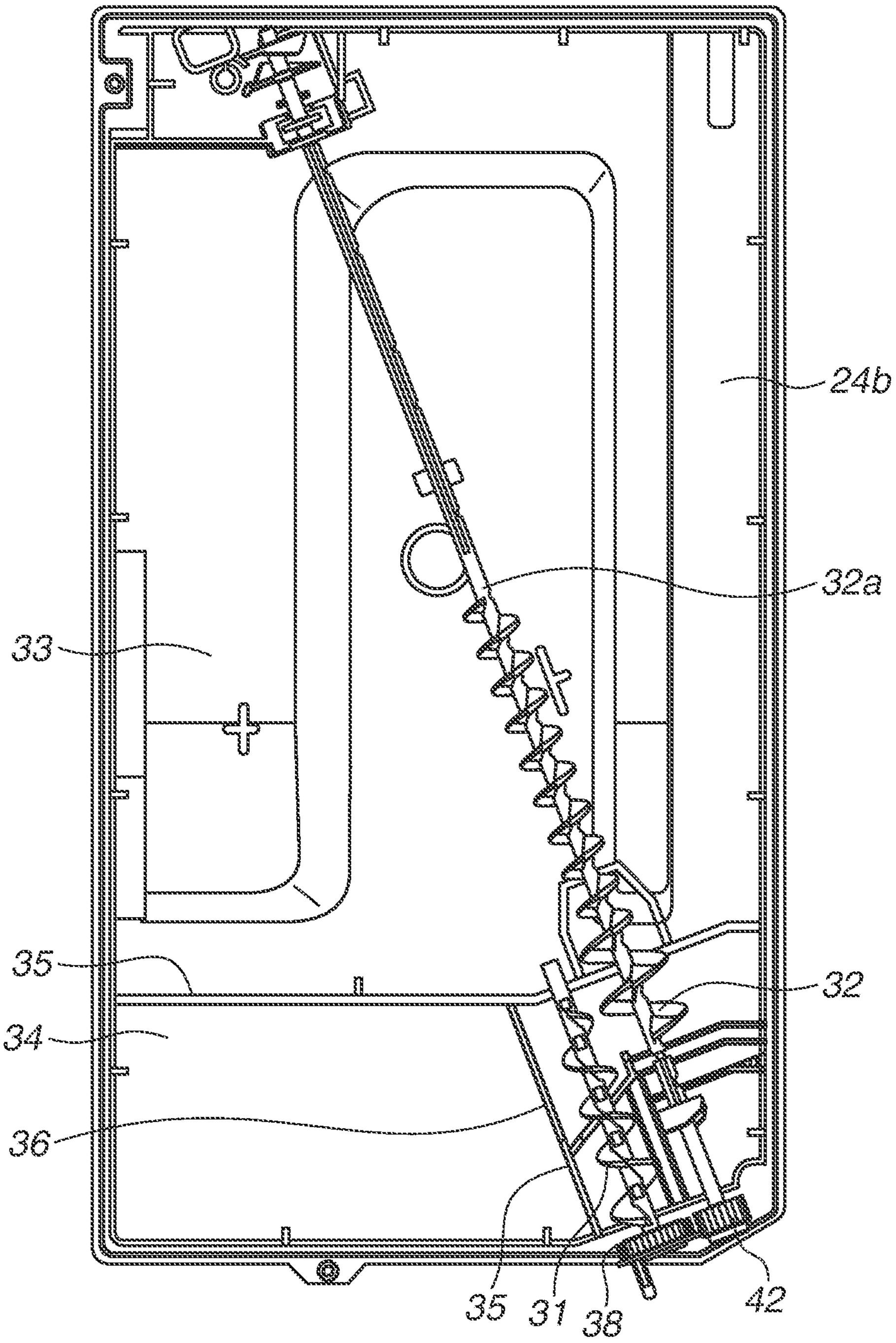
FIG. 8 is a top conceptual diagram illustrating a developer storage device according to a second exemplary embodiment of the present invention in a state in which the inside thereof is exposed with an upper structure thereof removed.

FIG. 8 is a top conceptual diagram illustrating a developer storage device according to the second exemplary embodiment of the present invention in a state in which an upper structure thereof is removed and an inside is exposed.

More specifically, FIG. 8 illustrates a state in which the upper structure **24*a*** is removed.

The second exemplary embodiment has a configuration basically similar to that according to the first exemplary embodiment, and a different point will be described below.

As illustrated in FIG. 8, the second exemplary embodiment has a configuration in which a second drive transmission unit 42 which is connected to the second screw 32 is connected to a drive source (not illustrated) different from that of the first screw 31, and the first screw 31 and the second screw 32 can rotate independently of each other. Since the second screw 32 can rotate independently, in a case where it is necessary to increase a toner conveyance force without change in a shape of the second screw 32, the conveyance force can be changed by increasing a rotation speed of only the second screw 32.

Since the drive source is different, the rotation of the second screw 32 can be freely switched between driving and stopping, so that the rotation regulating unit (the torque limiter 40) is not necessary.

Since a current value necessary for driving the drive source of the second screw 32 changes depending on the rotational load of the second screw 32, detecting of the current value of the drive source enables detection of a change in the toner storage amount in the first storage chamber 33. According to the second exemplary embodiment, a current value in a state in which the first storage chamber 33 is filled with the toner is set to a drive source setting value, and the replacement notice display is output when the current value exceeds the drive source setting value, thus detecting the toner storage amount. The drive of the second screw 32 is stopped after the current value exceeds the drive source setting value, thus conveying the toner to the second storage chamber 34 as in the first exemplary embodiment.

As described above, even with different drive unit and detection unit, the period for stopping printing of the image forming apparatus 1 can be eliminated by displaying the replacement notice to a user to provide a period for preparing a new toner collecting container 24 so that the user is prompted to replace the toner collecting container 24 immediately after the replacement necessity notice is issued. Accordingly, the usability is improved.

The present invention can be summarized as follows.

(1) The developer storage device (24) according to the present invention stores developer, and includes:

the frame (24F) that includes the internal space (IS) for storing the developer and the inlet (30) for feeding the developer into the internal space;

the partition portion (35) for partitioning the internal space into the first chamber (33) and the second chamber (34) having the smaller volume than the first chamber, which are arranged side by side in the horizontal direction in the posture during use, the partition portion including the communication port (36) with which the first chamber and the second chamber communicate;

the conveyance member (3T) arranged in the internal space and configured to convey the developer fed from the inlet; and the detection unit (SR) configured to detect an amount of the developer stored in the first chamber.

When the amount of the developer in the first chamber is less than the predetermined value, the developer is conveyed from a portion adjacent to the inlet (inlet side (S1)) to the far side (S2) of the first chamber by the conveyance member, and when the detection unit detects that the amount of the developer in the first chamber reaches the predetermined value or more, the conveyance member does not convey the developer to the far side of the first chamber but conveys the developer to the second chamber.

(2) In the developer storage device according to the present invention, the conveyance member (3T) can include the first conveyance screw (31) and the second conveyance screw (32) longer than the first conveyance screw. The first conveyance screw may be arranged closer to the inlet (30) than the second conveyance screw.

(3) In the developer storage device according to the present invention, the first conveyance screw (31) and the second conveyance screw (32) may be arranged side by side in the horizontal direction in the first chamber (33). The second conveyance screw can be arranged on the opposite side of the side where the communication port (36) is arranged in the horizontal direction with respect to the first conveyance screw.

(4) In the developer storage device according to the present invention, the first conveyance screw (31) may be arranged so that the lower end position (311) of the first conveyance screw is lower than the lower end position (361) of the communication port (36).

(5) The developer storage device according to the present invention can include the rotation regulating member (40) configured to regulate a rotation operation of the second conveyance screw when a predetermined rotational load is exceeded in rotation of the second conveyance screw (32).

(6) In the developer storage device according to the present invention, the detection unit (SR) can detect the amount of the developer in the first chamber (33) based on the rotation state of the second conveyance screw (32).

(7) In the developer storage device according to the present invention, the first conveyance screw (31) and the second conveyance screw (32) may be arranged nearly parallel to each other, and configured so that the conveyance amount of the second conveyance screw is greater than the conveyance amount of the first conveyance screw in the area (T1) in which the first conveyance screw and the second conveyance screw face each other.

(8) In the developer storage device according to the present invention, the first conveyance screw (31) can be arranged directly below the inlet (30), and the second conveyance screw (32) can be arranged to extend from a portion adjacent to the inlet (the inlet side (S1)) to a far side (S2) which is an opposite side of the portion adjacent to the inlet (inlet side).

(9) In the developer storage device according to the present invention, the frame (24F) may have a square shape in a plan view, and the inlet (30) may be arranged at the corner portion (AG1) of the square. The second conveyance screw (32) may be arranged to extend from a portion adjacent to the corner portion (AG1) to a portion adjacent to the corner portion (AG2) on the opposite side of the corner portion (AG1) on the diagonal line (X1).

(10) The image forming apparatus (1) according to the present invention includes:

the image bearing member (7) configured to bear a developer image;

the first collecting member (10) configured to collect the developer remaining on the image bearing member after the developer image is transferred from the image bearing member; and the above-described developer storage device (24) configured to store the developer collected by the first collecting member.

(11) The image forming apparatus according to the present invention can further includes:

the intermediate transfer member (18) to which the developer image is transferred from the image bearing member (7); and the second collecting member (22) configured to collect the developer remaining on the intermediate transfer member after the developer image is transferred from the intermediate transfer member. The developer collected by the second collecting member may be stored in the developer storage device (24).

(12) The image forming apparatus (1) according to the present invention includes:

the intermediate transfer member (18) to which the developer image is transferred from the image bearing member (7);

the collecting member (22) configured to collect the developer remaining on the intermediate transfer member after the developer image is transferred from the intermediate transfer member; and the above-described developer storage device (24) configured to store the developer collected by the collecting member.

According to the present invention, even if a shape of a storage unit of a developer storage device is a horizontally long shape in which a length in the gravity direction is short and a length in the horizontal direction is long, a service life or a replacement time can be accurately determined.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

What is claimed is:

1. A developer storage device that is used for an image forming apparatus and stores a developer, the developer storage device comprising:

a frame including an internal space for storing the developer and an inlet through which the developer is fed into the internal space;

a partition portion that partitions the internal space into a first chamber and a second chamber, the partition portion being provided with a communication port through which the first chamber and the second chamber communicate with each other;

a conveyance portion arranged in the internal space and configured to convey the developer that has been fed through the inlet, the conveyance portion including:

a first conveyance screw which is rotatably configured to convey the developer, a second conveyance screw which is rotatably configured to convey the developer in the first chamber and which is not coaxial with the first conveyance screw; and a detection unit for detecting rotation of the second conveyance screw, wherein after the detection unit no longer detects the rotation of the second conveyance screw, conveyance of the developer toward the second chamber by rotation of the first conveyance screw is started.

2. The developer storage device according to claim 1, wherein the first conveyance screw is arranged closer to the inlet than the second conveyance screw, the developer being conveyed by the first conveyance screw to a far side portion from an inlet side portion, the far side portion being an opposite side of the inlet side portion in a rotational axis direction of the second conveyance screw, the conveyance portion is configured to, in a case where an amount of a developer contained in the first chamber is less than a predetermined value, convey the developer toward the far side portion by rotation of both the first conveyance screw and the second conveyance screw, and the conveyance portion is configured to, in a case where the amount of the developer in the first chamber reaches the predetermined value or more, convey the developer to the second chamber via the communication port by the rotation of the first conveyance screw in a state that the rotation of the second conveyance screw stops.

3. The developer storage device according to claim 1, wherein, after the second conveyance screw stops rotating in response to the developer contained in the first chamber, the conveyance of the developer toward the second chamber by the rotation of the first conveyance screw is started.

4. The developer storage device according to claim 1, wherein, in a rotational axis direction, the first conveyance screw is arranged closer to the inlet than the second conveyance screw.

5. The developer storage device according to claim 1, wherein, in a horizontal direction in a posture in which the developer storage device is used in the image forming apparatus, the communication port is provided on a side opposite to a side where the second conveyance screw is provided with respect to the first conveyance screw.

6. The developer storage device according to claim 1, wherein, in a gravity direction in a posture in which the developer storage device is used in the image forming apparatus, a lower end of the first conveyance screw is arranged so that a lower end position of the first conveyance screw is provided below an upper end position of the partition portion.

7. The developer storage device according to claim 1, further comprising a rotation regulating member configured to regulate a rotation of the second conveyance screw in accordance with a rotational load of the second conveyance screw.

8. The developer storage device according to claim 1, wherein a conveyance amount of the second conveyance screw is greater than a conveyance amount of the first conveyance screw in an area where a part of the first conveyance screw and a part of the second conveyance screw are aligned in a horizontal direction in a posture in which the developer storage device is used in the image forming apparatus.

9. The developer storage device according to claim 1, wherein the inlet overlaps with the first conveyance screw when viewed in a gravity direction.

10. The developer storage device according to claim 1, wherein:

an outer shape of the frame has a smaller size in a gravity direction than in a horizontal direction in a posture in which the developer storage device is used in the image forming apparatus, the inlet is provided closer to one end of the frame than a central portion of the frame in a rotational axis direction when viewed in the gravity direction, and the second conveyance screw extends from the one end side of the frame to the other end side of the frame beyond the central portion of the frame in the rotational axis direction when viewed in the gravity direction.

11. An image forming apparatus comprising:

an image bearing member configured to bear a developer image;

a first collecting member configured to collect a developer remaining on the image bearing member after the developer image is transferred from the image bearing member; and the developer storage device according to claim 1 configured to store the developer collected by the first collecting member.

12. The image forming apparatus according to claim 11, further comprising:

an intermediate transfer member to which the developer image is transferred from the image bearing member; and a second collecting member configured to collect the developer remaining on the intermediate transfer member after the developer image is transferred from the intermediate transfer member to a transfer material, wherein the developer collected by the second collecting member is stored in the developer storage device.

13. An image forming apparatus comprising:

an intermediate transfer member to which a developer image is transferred from an image bearing member;

a collecting member configured to collect the developer remaining on the intermediate transfer member after the developer image is transferred from the intermediate transfer member; and the developer storage device according to claim 1, wherein the developer collected by the collecting member is stored in the developer storage device.

14. The developer storage device according to claim 1, further comprising:

a driven gear;

a torque limiter via which the second conveyance screw is connected to the driven gear;

a lever interlocking with the second conveyance screw; and a photosensor in which light is shielded or transmitted by rotation of the lever;

wherein in a case where the second conveyance screw and the torque limiter idle in a state that the rotation of the second conveyance screw stops, an output of the photosensor is not switched between a shielded state that the light is shielded and a transmitted state that the light is transmitted.

* * * * *